No. 850,166. PATENTED APR. 16, 1907.
R. C. LANPHIER.
ELECTRICAL CONDENSER AND METHOD OF MAKING THE SAME.
APPLICATION FILED DEC. 13, 1905.
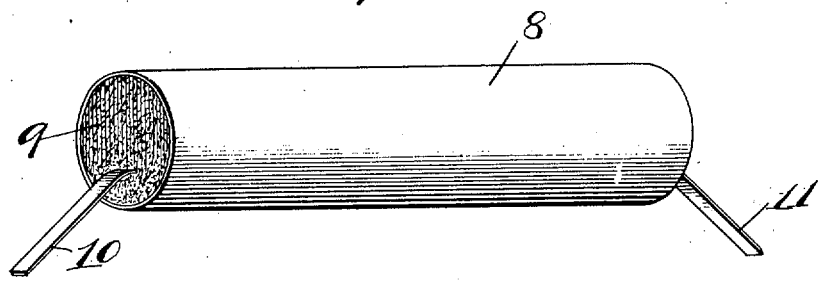
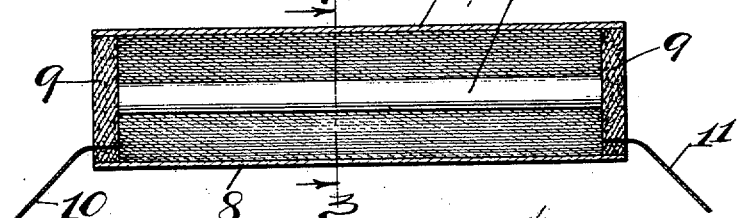
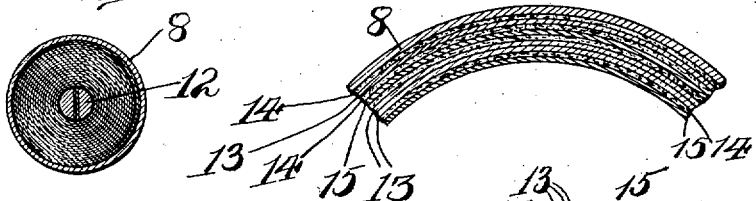
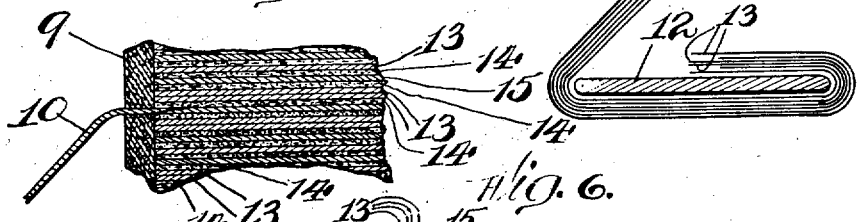
Witnesses:
J. B. Weir
D. V. Domarus.
Inventor:
Robert C. Lanphier
by Bond, Adams, Pickard & Jackson
Attys.

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

ELECTRICAL CONDENSER AND METHOD OF MAKING THE SAME.

No. 850,166.   Specification of Letters Patent.   Patented April 16, 1907.

Application filed December 13, 1905. Serial No. 291,650.

*To all whom it may concern:*

Be it known that I, ROBERT C. LANPHIER, a citizen of the United States, residing at Springfield, in the county of Sangamon and State of Illinois, have invented certain new and useful Improvements in Electrical Condensers and Methods of Making the Same, of which the following is a specification, reference being had to the accompanying drawings.

My invention relates to an improved electrical condenser and to the method or process of manufacturing the same.

Condensers have been known and used for electrical purposes for many years and have been built in various forms. The best-known forms of condensers are of two kinds—first, condensers consisting of alternating sheets or plates of mica and tin-foil or other thin metallic conductor, and, second, condensers consisting of some dielectric, such as paper treated with paraffin and tin-foil. It has also been customary to construct condensers commercially by using long strips or ribbons of paper and tin-foil wound or rolled together tightly upon a core, thus producing a condenser of suitable capacity and at small expense. In actual practice there are a number of objections to these condensers, which are well known and to avoid which a number of expedients and devices have been resorted to without, I believe, full success.

It is the object of my invention to produce a new and improved condenser by a new and improved method which will obviate these difficulties and will enable the manufacture of a condenser having almost equal capacity for a given area with the best mica condensers and of practically as high insulation and yet of low cost and of easy manufacture.

To this end my new and improved method consists, broadly, in immersing a condenser which has been formed or built up of alternating layers of tin-foil or a similar thin conductor and of an untreaded dielectric in a bath of sulfur heated to a temperature of about 300° or to the temperature at which sulfur becomes fluid, and preferably under pressure.

As no special form of apparatus is necessary for the producing of my method and the manufacture of the condenser, I have illustrated my condenser in the drawings in order that its structure may be readily understood.

In the accompanying drawings, Figure 1 is a perspective view of one form of my condenser in its casing. Fig. 2 is a vertical longitudinal section. Fig. 3 is a cross-section on line 3 3 of Fig. 2. Fig. 4 is an enlarged detail, being a vertical section through a portion of the condenser in order to show the alternate layers of paper, the sulfur with which the condenser is impregnated, and the tin-foil. Fig. 5 is an enlarged detail, being a cross-section of a portion of the condenser. Fig. 6 is a diagrammatic view showing the way in which the condenser is wound, and Fig. 7 is a modification showing the condenser wound upon a flat core.

Referring to the drawings, 8 indicates the casing, and 9 the plugs at the end of the condenser, through which the terminals 10 11 protrude.

12 indicates the core upon which the condenser is wound.

Referring particularly to Figs. 4 and 5, 13 indicates the layers of paper. 14 indicates the sulfur after the condenser has been impregnated with the sulfur between the layers of paper and tin-foil, and 15 indicates the layers of tin-foil.

Referring to Figs. 6 and 7, the method of winding the condenser will be seen. First a strip of paper is laid down, upon that a strip of tin-foil or similar thin metallic conductor, upon this preferably two strips of paper, upon this another strip of tin-foil, and upon the top another strip of paper. The strips of paper are longer and wider than the tin-foil, so as to extend out over the ends and sides. In case a cylindrical core is used for the formation of a cylindrical condenser, such as I have shown, the ends of the paper strips are placed in a suitable slot, as is shown in Fig. 6, and the whole is tightly and closely wound into a cylindrical body. In case it is desired to make a flat-shaped condenser a flat core is used, such as is shown in Fig. 7, and the strips wound upon it, as indicated in said figure. It is believed that it is unnecessary to describe this more fully, as so far the condenser is manufactured in the old and well-known manner. Before the winding is completed terminals are attached. These terminals are of copper, and as the subsequent treatment would eat away the copper I coat the copper strips with lead or tin. I use a fine insulating-paper carefully selected, so as to be as free from flaws as possible and not treated with paraffin or any other insulating material before or during the process of rolling. Between the layers of tin-foil, as has been said above, I prefer to use two layers of paper, or, if the condenser is to be used for very high potentials, three.

When thus built up or rolled, I inclose the condenser in a strong metal shell open at the ends, and the condenser is then thoroughly dried for a number of hours at a temperature of about 200° Farhenheit in order to expel all moisture. I then immerse the condenser inclosed in this metal shell in a bath of sulfur heated to a temperature of between 280° and 310° Fahrenheit, at which temperature, as is well known, sulfur becomes an extremely thin liquid and will enter the smallest crevices, particularly under pressure. I therefore use an ordinary sulfur-pressure kettle, in which the melted sulfur may be maintained at a suitable pressure of, say, about fourteen pounds to the square inch. The impregnating process may, however, be carried out, though more slowly, by simply immersing the condenser in molten sulfur for several hours in an open kettle. The condensers thus immersed are allowed to remain in the sulfur-bath until all traces of air-bubbles arising from the ends of the condenser cease. This process causes the sulfur to enter all the crevices, to thoroughly impregnate the condenser throughout, and to form very thin layers between the tin-foil and the sheets of paper. After being removed the sulfur of course sets hard, after which the outer metal casing can be removed and the condenser placed in any kind of a shell or casing that may be desired. The casing 8 projects beyond the ends of the strips of tin-foil and paper, and the space thus left is filled in with a protecting-plug 9, which may be formed by melting bitumen or some other insulating material into the ends in any well-known way.

It is obvious that a condenser made by the employment of my new and improved method might be formed otherwise than by the use of long strips wound upon a core without departing from the spirit of my invention, and I do not, therefore, confine myself to a condenser so constructed except as specifically claimed.

What I claim as new, and desire to secure by Letters Patent, is—

1. The process of insulating a condenser, which consists in immersing the same in a bath of sulfur heated to the point at which the sulfur becomes a thin liquid, substantially as described.

2. The process of insulating a condenser, which consists in first thoroughly drying the same and then immersing the same in a bath of sulfur heated to the point at which the sulfur becomes a thin liquid, substantially as described.

3. The method of insulating a condenser composed of strips of conducting metal between and separated by strips of thin insulating material, which consists in immersing the same in a bath of sulfur heated to the point at which the sulfur becomes a thin liquid, substantially as described.

4. The method of making an electrical condenser, which consists in constructing the condenser of thin layers of conducting metal between and separated by layers of paper and then immersing the same in a bath of sulfur heated to the point at which the sulfur becomes a thin liquid, substantially as described.

5. The method of making an electrical condenser, which consists in winding strips of metal foil between and separated by strips of paper tightly together, thoroughly drying the same, and then immersing the whole in a bath of sulfur heated to the point at which the sulfur becomes a thin liquid, substantially as described.

6. The method of making an electrical condenser, which consists in rolling tightly upon a core two strips of metal foil between and separated by strips of paper, thoroughly drying the same, inclosing the same in a casing, and then immersing the whole in a bath of sulfur heated to the point at which it becomes a thin liquid, until the air is all expelled from the same and the condenser is completely impregnated with the sulfur between the layers of the metal foil and the paper, substantially as described.

7. The condenser formed by the herein-described method of winding upon a central core strips of conducting metal between and separated by strips of paper and then immersing the same in a bath of sulfur heated to the point at which the sulfur becomes a thin liquid, until the same is completely impregnated with sulfur, substantially as described.

8. The electrical condenser formed by the herein-described method of rolling tightly upon a core two strips of metal foil, between and separated by strips of paper, and then immersing the same in a bath of sulfur heated to a point at which the sulfur becomes a thin liquid, until the air is completely expelled and the condenser thoroughly impregnated with sulfur between the layers of metal foil and the paper, substantially as described.

9. An electrical condenser consisting of thin strips of conducting material separated by strips of paper and having, between the strips of paper and the conducting material, thin layers of sulfur introduced therein by immersing the condenser in a bath of sulfur heated to a point at which the sulfur becomes a thin liquid.

10. An electrical condenser consisting of thin strips of metal foil separated by strips of paper and having, between the strips of paper and the metal foil, thin layers of sulfur introduced therein by immersing the condenser in a bath of sulfur heated to a point at which the sulfur becomes a thin liquid until the air is completely expelled and the spaces between the paper and the metal foil become filled with a layer of sulfur.

ROBERT C. LANPHIER.

In presence of—
EDWARD J. PIERCE,
BERNARD G. HEYN.